(12) United States Patent
Oberheide et al.

(10) Patent No.: US 9,532,222 B2
(45) Date of Patent: Dec. 27, 2016

(54) SYSTEM AND METHOD OF NOTIFYING MOBILE DEVICES TO COMPLETE TRANSACTIONS AFTER ADDITIONAL AGENT VERIFICATION

(71) Applicant: Duo Security, Inc., Ann Arbor, MI (US)

(72) Inventors: Jon Oberheide, Ann Arbor, MI (US); Omar Abduljaber, Ypsilanti, MI (US); Boyang Zhu, Troy, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/146,223

(22) Filed: May 4, 2016

(65) Prior Publication Data

US 2016/0255505 A1  Sep. 1, 2016

Related U.S. Application Data

(63) Continuation-in-part of application No. 13/039,209, filed on Mar. 2, 2011.

(60) Provisional application No. 61/309,885, filed on Mar. 3, 2010.

(51) Int. Cl.
*H04W 12/06* (2009.01)
*H04L 29/06* (2006.01)

(52) U.S. Cl.
CPC .......... *H04W 12/06* (2013.01); *H04L 63/0428* (2013.01); *H04L 63/083* (2013.01); *H04L 63/0861* (2013.01)

(58) Field of Classification Search
CPC ... H04W 12/06; H04L 63/0861; H04L 63/083; H04L 63/0428
See application file for complete search history.

(56) References Cited

U.S. PATENT DOCUMENTS

| 5,838,792 A | 11/1998 | Ganesan |
| 5,870,723 A | 2/1999 | Pare et al. |
| 6,119,096 A | 9/2000 | Mann et al. |
| 6,209,091 B1 | 3/2001 | Sudia et al. |

(Continued)

OTHER PUBLICATIONS

Goldfeder et al., Securing Bitcoin wallets via a new DSA/ECDSA threshold signature scheme, http://www.cs.princeton.edu/18 stevenag/threshold_sigs.pdf, 2015.

(Continued)

*Primary Examiner* — Darren B Schwartz
(74) *Attorney, Agent, or Firm* — Jeffrey Schox; Padowithz Alce

(57) ABSTRACT

A method of completing a transaction that requires authorization by an authority agent includes registering an authority device as associated with the authority agent, receiving a transaction request from a service provider; pushing an authentication notification to the authenticating application of the authority device; displaying the authentication notification, including a prompt to supply agent verification data, on the authority device; collecting and verifying the agent verification data; in response to verification of the agent verification data, transmitting an authority agent response from the authority device to the authentication platform, and, at the authentication platform, authenticating the authority agent response; and in response to authenticating the authority agent response, transmitting a transaction confirmation from the authentication platform to the service provider.

17 Claims, 8 Drawing Sheets

(56) References Cited

U.S. PATENT DOCUMENTS

| | | | |
|---|---|---|---|
| 6,311,272 B1* | 10/2001 | Gressel | G06K 9/00885 |
| | | | 380/258 |
| 6,694,025 B1 | 2/2004 | Epstein et al. | |
| 6,758,394 B2 | 7/2004 | Maskatiya et al. | |
| 6,823,359 B1 | 11/2004 | Heidingsfeld et al. | |
| 6,934,858 B2 | 8/2005 | Woodhill | |
| 6,956,950 B2 | 10/2005 | Kausik | |
| 7,096,354 B2 | 8/2006 | Wheeler et al. | |
| 7,331,518 B2 | 2/2008 | Rable | |
| 7,447,784 B2 | 11/2008 | Eun | |
| 7,463,637 B2 | 12/2008 | Bou-Diab et al. | |
| 7,496,662 B1 | 2/2009 | Roesch et al. | |
| 7,526,792 B2 | 4/2009 | Ross | |
| 7,562,382 B2 | 7/2009 | Hinton et al. | |
| 7,574,733 B2 | 8/2009 | Woodhill | |
| 7,711,122 B2 | 5/2010 | Allen et al. | |
| 7,953,979 B2 | 5/2011 | Borneman et al. | |
| 7,982,595 B2 | 7/2011 | Hanna et al. | |
| 8,028,329 B2 | 9/2011 | Whitcomb | |
| 8,136,148 B1 | 3/2012 | Chayanam et al. | |
| 8,161,527 B2 | 4/2012 | Curren | |
| 8,200,980 B1 | 6/2012 | Robinson et al. | |
| 8,245,044 B2 | 8/2012 | Kang | |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,510,820 B2 | 8/2013 | Oberheide et al. | |
| 8,538,028 B2 | 9/2013 | Yeap et al. | |
| 8,539,567 B1 | 9/2013 | Logue et al. | |
| 8,627,438 B1 | 1/2014 | Bhimanaik | |
| 8,646,060 B1* | 2/2014 | Ben Ayed | H04L 63/0853 |
| | | | 726/9 |
| 8,646,086 B2 | 2/2014 | Chakra et al. | |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,745,703 B2 | 6/2014 | Lambert et al. | |
| 8,763,077 B2 | 6/2014 | Oberheide et al. | |
| 8,806,609 B2 | 8/2014 | Gladstone et al. | |
| 2,639,997 A1 | 9/2014 | Wiesmaier et al. | |
| 8,850,516 B1 | 9/2014 | Hrebicek et al. | |
| 8,893,230 B2 | 11/2014 | Oberheide et al. | |
| 8,898,762 B2 | 11/2014 | Kang | |
| 9,223,961 B1 | 12/2015 | Sokolov | |
| 9,282,085 B2 | 3/2016 | Oberheide et al. | |
| 9,391,980 B1* | 7/2016 | Krahn | H04L 63/0823 |
| 2002/0013898 A1* | 1/2002 | Sudia | G06Q 20/02 |
| | | | 713/155 |
| 2002/0123967 A1 | 9/2002 | Wang | |
| 2003/0115452 A1 | 6/2003 | Sandhu et al. | |
| 2003/0120931 A1 | 6/2003 | Hopkins et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2004/0218763 A1 | 11/2004 | Rose et al. | |
| 2005/0218215 A1 | 10/2005 | Lauden | |
| 2005/0221268 A1 | 10/2005 | Chaar et al. | |
| 2005/0240522 A1 | 10/2005 | Kranzley et al. | |
| 2005/0268107 A1 | 12/2005 | Harris et al. | |
| 2006/0059569 A1* | 3/2006 | Dasgupta | G06F 21/32 |
| | | | 726/28 |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0184788 A1 | 8/2006 | Sandhu et al. | |
| 2006/0242692 A1 | 10/2006 | Thione et al. | |
| 2007/0016948 A1 | 1/2007 | Dubrovsky et al. | |
| 2007/0081667 A1 | 4/2007 | Hwang | |
| 2007/0156659 A1* | 7/2007 | Lim | G06F 21/6227 |
| 2007/0186106 A1* | 8/2007 | Ting | H04L 63/104 |
| | | | 713/168 |
| 2007/0199060 A1 | 8/2007 | Touboul | |
| 2007/0228148 A1 | 10/2007 | Rable | |
| 2007/0250914 A1 | 10/2007 | Fazal | |
| 2007/0258594 A1 | 11/2007 | Sandhu et al. | |
| 2007/0284429 A1 | 12/2007 | Beeman | |
| 2008/0049642 A1 | 2/2008 | Gudipudi et al. | |
| 2008/0069347 A1 | 3/2008 | Brown et al. | |
| 2008/0120411 A1 | 5/2008 | Eberle | |
| 2008/0229104 A1 | 9/2008 | Ju et al. | |
| 2009/0055906 A1 | 2/2009 | Wendorff | |
| 2009/0077060 A1 | 3/2009 | Sermersheim et al. | |
| 2009/0187986 A1 | 7/2009 | Ozeki | |
| 2009/0210705 A1 | 8/2009 | Chen | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0131755 A1 | 5/2010 | Zhu et al. | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0257610 A1 | 10/2010 | Hohl | |
| 2010/0274859 A1* | 10/2010 | Bucuk | H04L 63/08 |
| | | | 709/206 |
| 2010/0330969 A1 | 12/2010 | Kim et al. | |
| 2011/0026716 A1 | 2/2011 | Tang et al. | |
| 2011/0086616 A1 | 4/2011 | Brand et al. | |
| 2011/0107389 A1 | 5/2011 | Chakarapani | |
| 2011/0113484 A1* | 5/2011 | Zeuthen | G06F 21/6281 |
| | | | 726/19 |
| 2011/0119765 A1 | 5/2011 | Hering et al. | |
| 2011/0138469 A1 | 6/2011 | Ye et al. | |
| 2011/0145900 A1* | 6/2011 | Chern | H04L 9/3271 |
| | | | 726/7 |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 | 12/2011 | Nair et al. | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0198228 A1 | 8/2012 | Oberheide et al. | |
| 2012/0216239 A1 | 8/2012 | Yadav et al. | |
| 2012/0227098 A1 | 9/2012 | Obasanjo et al. | |
| 2012/0300931 A1 | 11/2012 | Ollikainen et al. | |
| 2013/0042002 A1 | 2/2013 | Cheeniyil et al. | |
| 2013/0060708 A1 | 3/2013 | Oskolkov et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0117826 A1 | 5/2013 | Gordon et al. | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0239167 A1 | 9/2013 | Sreenivas et al. | |
| 2013/0239168 A1 | 9/2013 | Sreenivas et al. | |
| 2013/0239177 A1 | 9/2013 | Sigurdson et al. | |
| 2013/0246281 A1* | 9/2013 | Yamada | G06F 21/31 |
| | | | 705/71 |
| 2013/0326224 A1 | 12/2013 | Yavuz | |
| 2013/0326493 A1 | 12/2013 | Poonamalli et al. | |
| 2014/0019752 A1* | 1/2014 | Yin | H04L 63/0435 |
| | | | 713/155 |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0244993 A1 | 8/2014 | Chew | |
| 2014/0245278 A1 | 8/2014 | Zellen | |

(56) References Cited

U.S. PATENT DOCUMENTS

| | | |
|---|---|---|
| 2014/0245396 A1 | 8/2014 | Oberheide et al. |
| 2014/0351954 A1 | 11/2014 | Brownell et al. |
| 2015/0012914 A1 | 1/2015 | Klein et al. |
| 2015/0237026 A1* | 8/2015 | Kumar .................. H04L 63/08 726/28 |
| 2016/0056962 A1* | 2/2016 | Mehtala ................ H04L 9/3234 713/169 |
| 2016/0164866 A1* | 6/2016 | Oberheide .......... H04L 63/0861 726/1 |
| 2016/0180072 A1* | 6/2016 | Ligatti ................ H04L 63/0853 726/7 |

OTHER PUBLICATIONS

Simske et al., "APEX: Automated Policy Enforcement eXchange", Sep. 21-24, 2010, ACM, pp. 139-142.
Symantec, Administration Guide for Symantec TM Endpoint Protection and Symantec Network Access Control, Aug. 1, 2007.
Symantec, Administration guide for symantec Endpoint protection and symantec network access control, 2009, version 11.00.05.00.00.

\* cited by examiner

SYSTEM AND METHOD OF NOTIFYING MOBILE DEVICES TO COMPLETE TRANSACTIONS AFTER ADDITIONAL AGENT VERIFICATION

CROSS-REFERENCE TO RELATED APPLICATIONS

This application is a continuation in part of U.S. application Ser. No. 13/039,209, filed 2 Mar. 2011, which claims the benefit of U.S. Provisional Application No. 61/309,885, filed 3 Mar. 2010, all of which are incorporated in their entireties by this reference.

TECHNICAL FIELD

This invention relates generally to the digital security services field, and more specifically to a new and useful system and method of notifying mobile devices to complete transactions after additional agent verification in the digital security field.

BACKGROUND

Fraudulent transactions, whether executed online by a malicious party who has stolen a user's online banking password or offline by a malicious party entering a restricted building using a forged identification card, are indicators of a lack of authentication in present day security systems. Similarly, authorization (permission to complete a transaction) is limited without a strong notion of authentication. Traditionally, techniques for authentication are classified into several broad classes such as "what you know" (e.g., passwords or a social security number), "what you have" (e.g., physical possessions such as ATM cards or a security dongle), and "what you are" (e.g., biometric information such as a finger print or DNA). However, many of these solutions are burdensome to users, requiring the user to remember information or carry extra devices to complete a transaction. Thus, there is a need in the digital security services field to create a new and useful system and method of notifying mobile devices to complete transactions after additional agent verification. This invention provides such a new and useful system and method.

DESCRIPTION OF THE PREFERRED EMBODIMENTS

Figure 1:
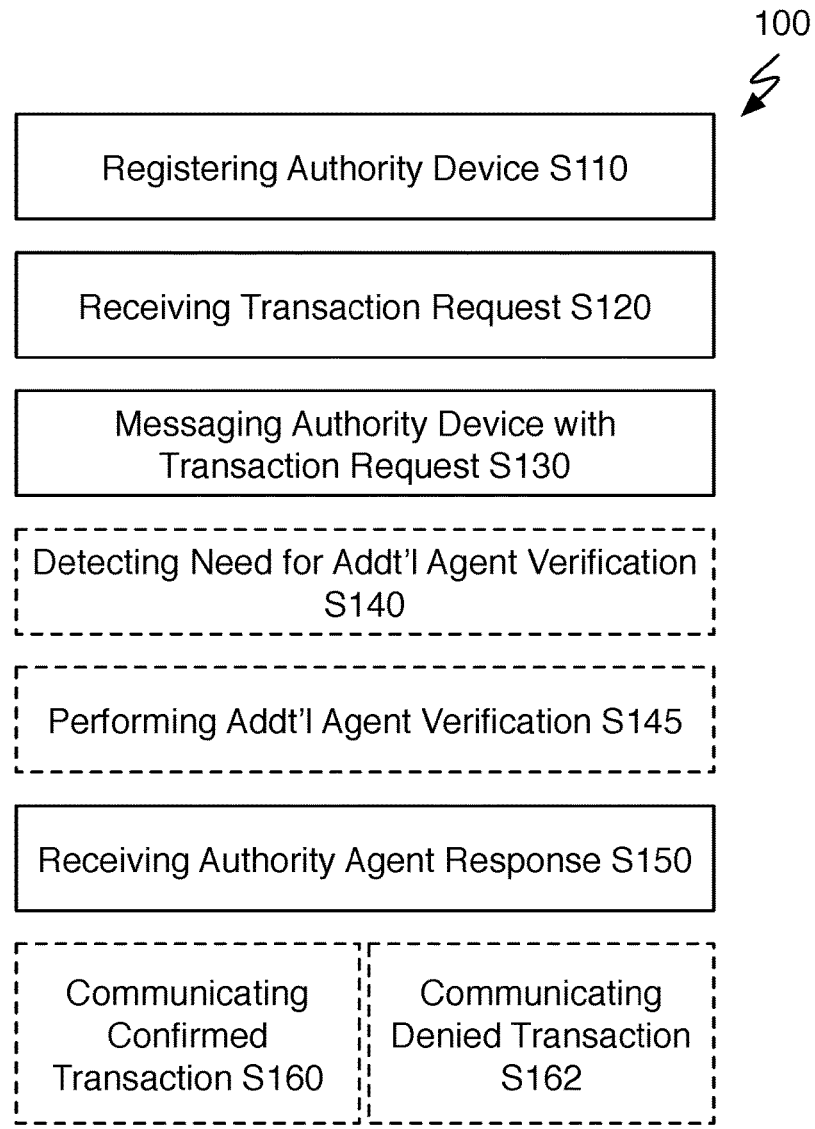
FIG. 1 is a chart representation of a method of a preferred embodiment.

The following description of the preferred embodiments of the invention is not intended to limit the invention to these preferred embodiments, but rather to enable any person skilled in the art to make and use this invention.

1. Method for Notifying Mobile Devices to Complete Transactions

As shown in FIGS. 1-4, a method 100 for notifying mobile devices to complete transactions includes registering an authority device for an account on an authentication platform S110, receiving a transaction request from an initiator to the authentication platform S120, messaging the authority device with the transaction request S130, receiving an authority agent response from the authority device to the authentication platform S150, if the authority agent response confirms the transaction, communicating a confirmed transaction to the initiator S160, and if the authority agent response denies the transaction, communicating a denied transaction to the initiator S162. In a variation of a preferred embodiment, the method 100 may also include detecting a need for additional agent verification S140 and/or performing additional agent verification S145, described further in Section 2.

The method functions to use push-based challenges on mobile device for the authentication and/or authorization of parties involved in a transaction. The method functions to utilize non-intrusive techniques while providing improved security. The pushed messages preferably alert a user to the transaction request in real-time such that a decision of confirmation or denial of a transaction can be communicated to a requesting party with minimal time lag (e.g., preferably less than a minute, and more preferably less than 10 seconds). The method may be employed as standalone transaction validation or incorporated into a multifactor system. The method may be used in application such as web-based applications, remote access credentials, privileged account management, financial transactions, password recovery/reset mechanisms, physical access control, Automatic Teller Machine (ATM) withdrawals, domain name transfers, online or offline transactions, building access security, or any suitable application requiring authentication and/or authorization.

The method is preferably performed by an authentication platform that communicates with a client of an initiating agent and an authority device associated with an account of the authentication platform. The authentication platform is preferably an internet accessible server that may be hosted on a distributed computing system, but may be hosted on any suitable platform. The initiating agent is typically a user or process that initiates a transaction. The requested transaction is preferably initiated by the initiating agent through a client such as a website, application, or device (e.g., an ATM machine). For authentication, the initiator agent may be a legitimate party or a malicious party attempting to fraudulently impersonate the legitimate party. For authorization, the initiating agent may be a legitimate authenticated party but may require approval from other parties to perform the action of the transaction. The authority device is preferably a device associated with an authentic agent that is a user or process that is legitimately authenticated or authorized to execute transactions. Even if a malicious entity were attempting to impersonate a user or authentic agent through stolen credentials or other means, they would—ideally—lack the authority device to complete a transaction.

Figure 5:
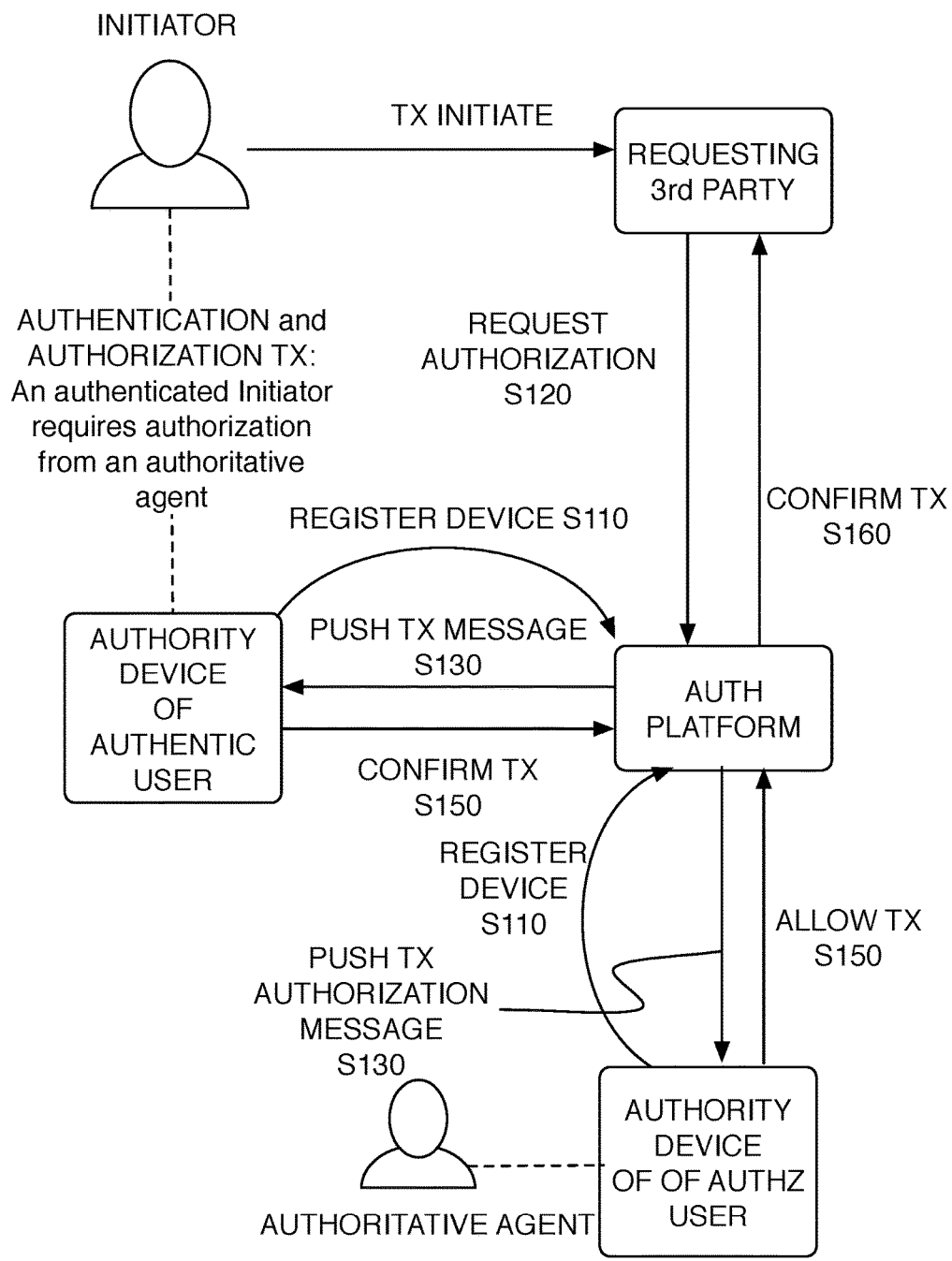
FIG. 5 is a schematic representation of a method of a preferred embodiment for authenticating and authorizing a transaction.
Figure 6:
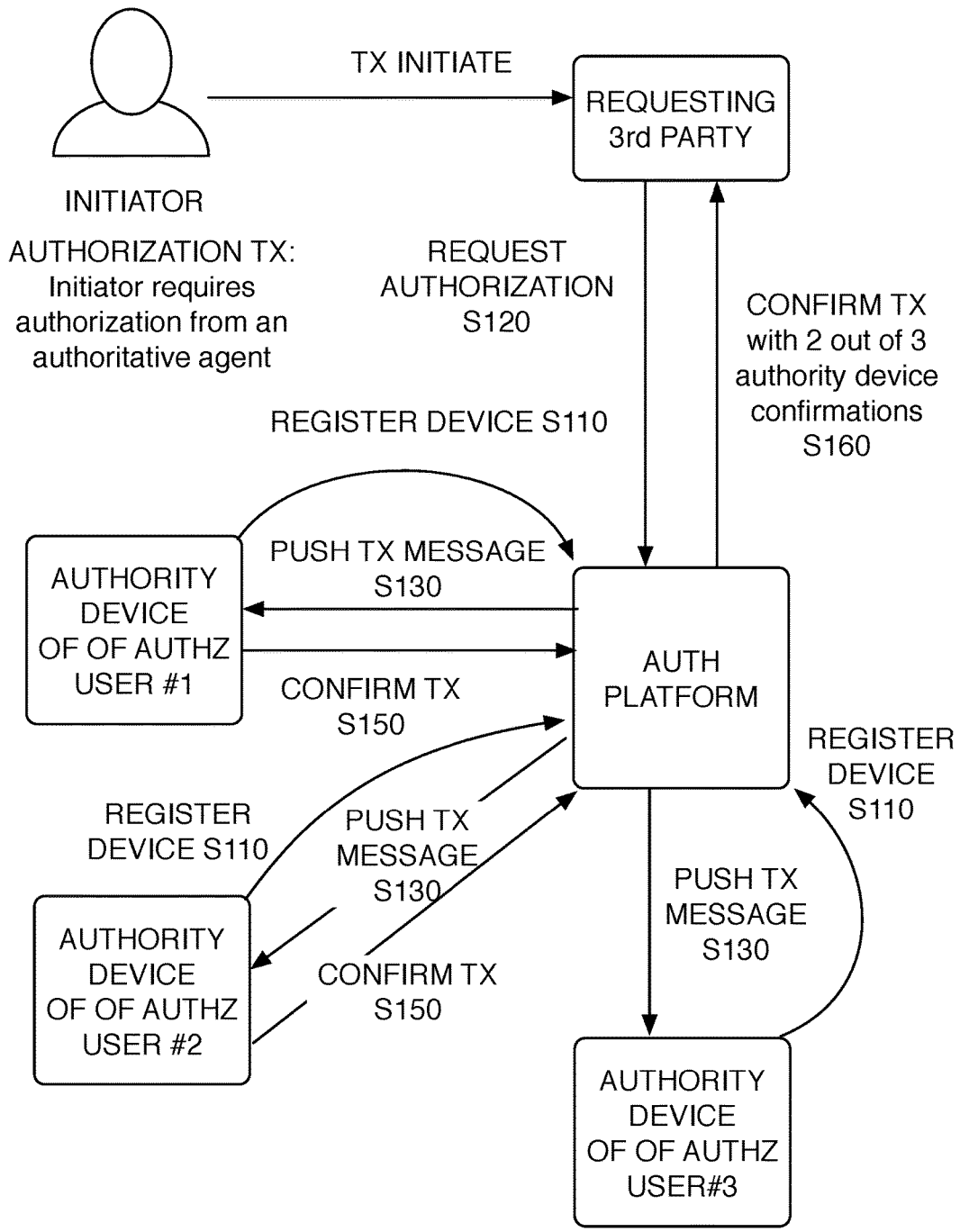
FIG. 6 is a schematic representation of a method of a preferred embodiment with a plurality of authority devices.

Step S110, which includes registering an authority device for an account on an authentication platform, functions to identify a device of an agent that is permitted to authenticate or authorize transactions. The registration preferably occurs prior to a transaction request, and is preferably performed during an initial setup of an account on the authentication platform. During the setup authentication and/or authorization rules are preferably set. The authority device is preferably a mobile computing device possessed by an authentic user or an authorized agent. The mobile device is preferably a mobile phone, tablet computer, smartphone, personal data assistant (PDA), personal computer, and/or any suitable computing device. The authority device preferably has access to a network over which communication with the authentication platform is performed, such as a WiFi network, local-area network, telephony network, short message service (SMS) network, multimedia messaging service (MMS), or any suitable network. A plurality of devices may additionally be registered, as shown in FIG. 6. A second authority device may provide a backup communication point if a primary authority device does not respond. For example, after attempting to contact a primary authority device, the authentication platform may message a secondary authority device for authentication or authorization. Or, alternatively, a threshold of two confirmations may need to be received to authorize a transaction. Additionally, a first authority device may be registered for authenticating the identity of an agent of the transaction request, and a second authority device may be registered for authorizing an action of an agent such that authentication and authorization may both be enabled, as shown in FIG. 5.

Figure 2:
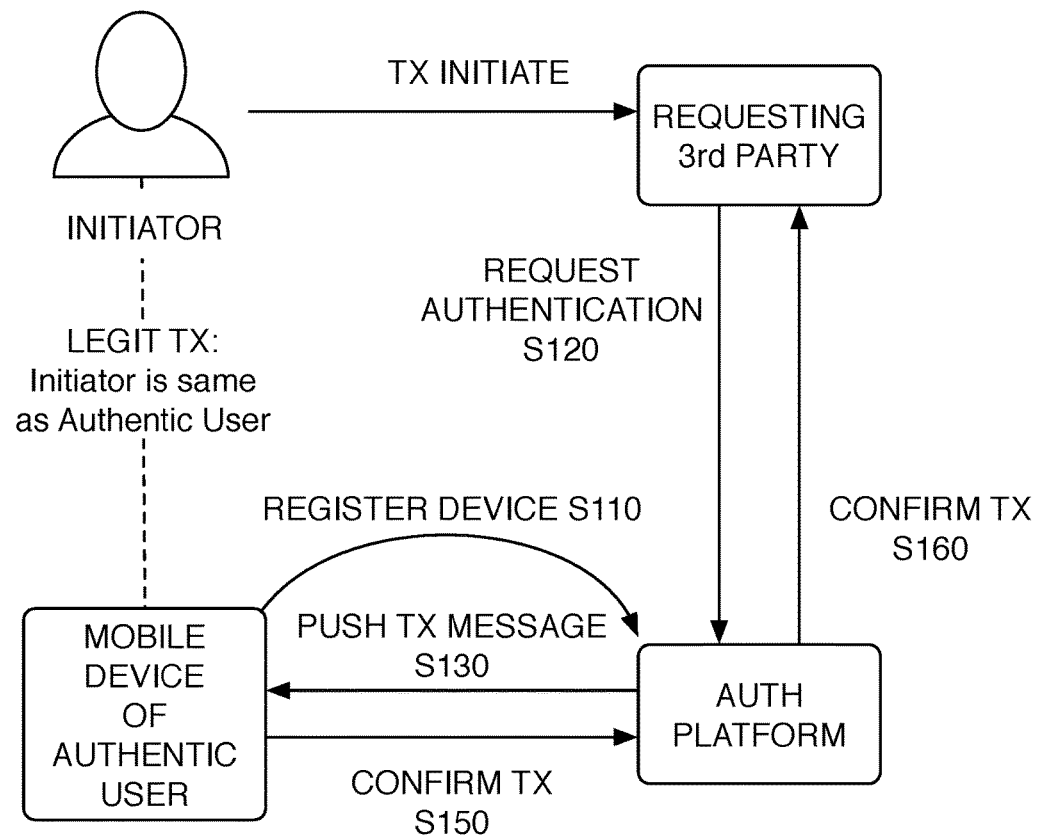
FIGS. 2 and 3 are schematic representations of a method of a preferred embodiment for authenticating a transaction.
Figure 3:
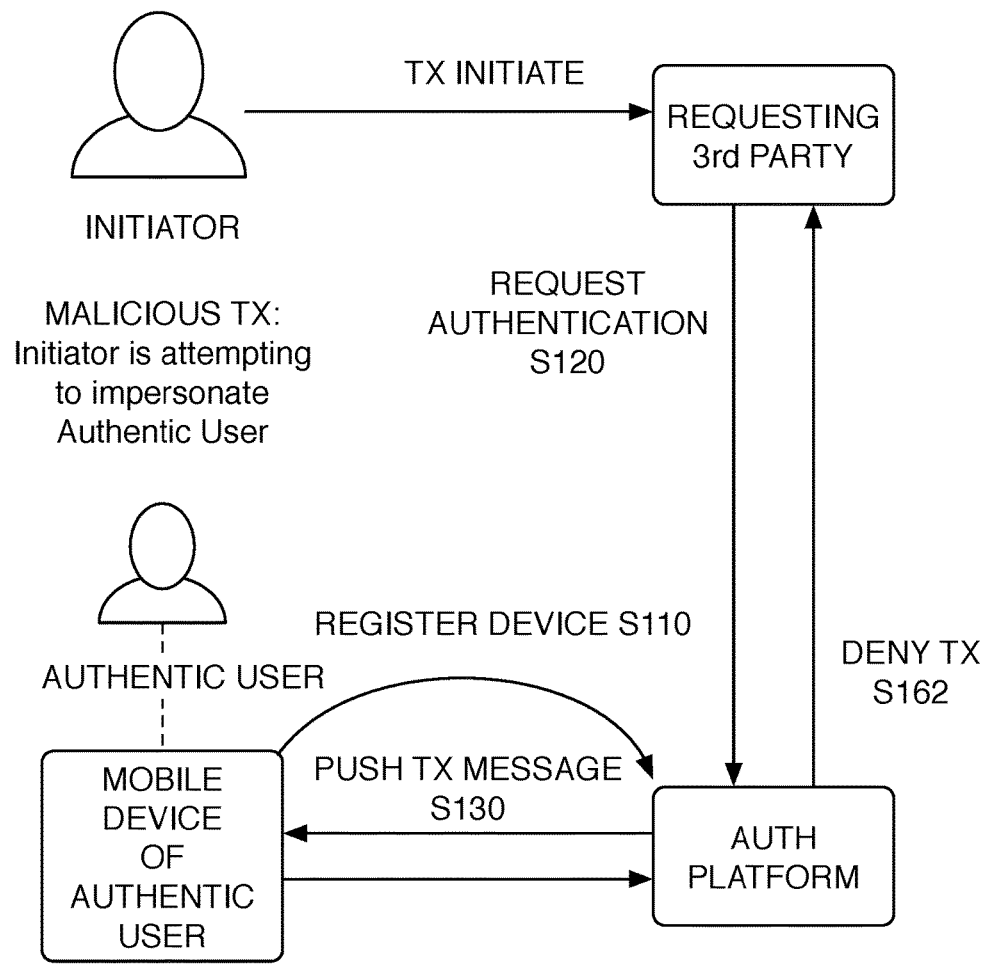
Figure 4:
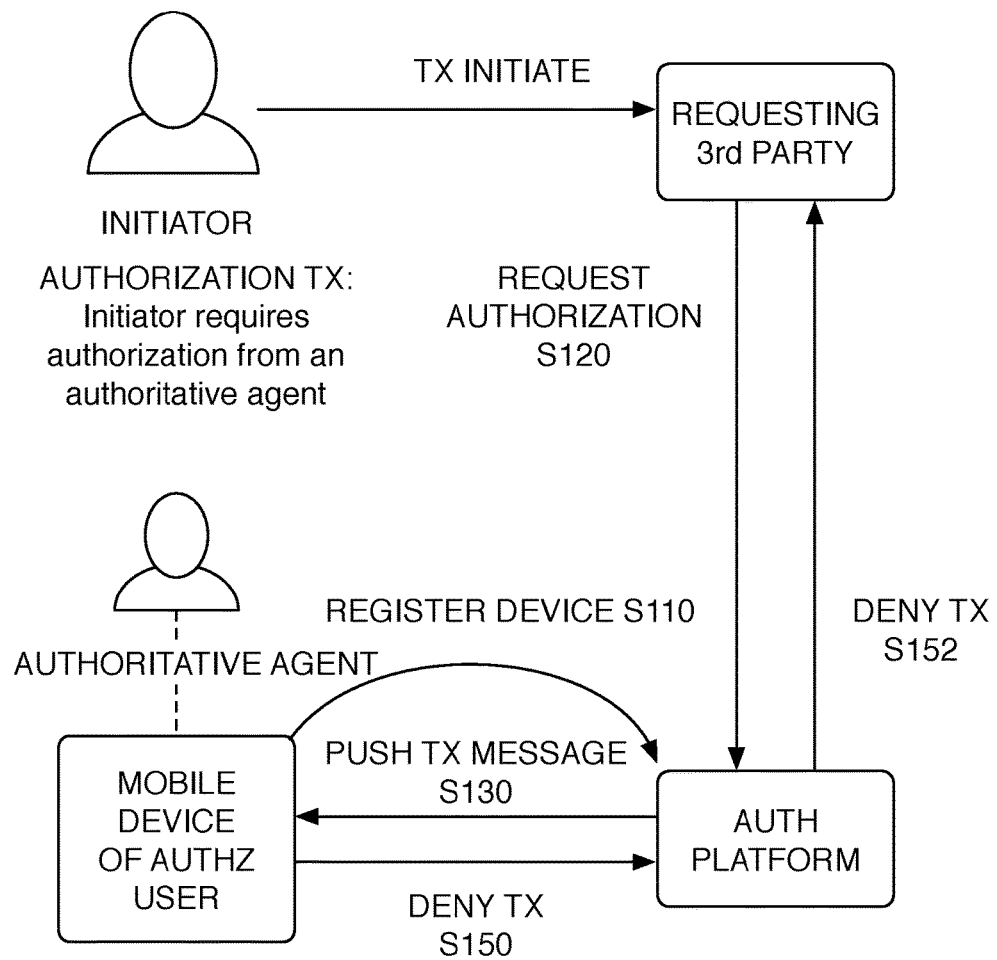
FIG. 4 is a schematic representation of a method of a preferred embodiment for authorizing a transaction.

Step S120, which includes receiving a transaction request from an initiator to the authentication platform, functions to initiate a transaction. The transaction is preferably any event, transfer, action, or activity (e.g., involving a service provider) that requires authentication and/or authorization of an involved party (e.g., an authority agent). Exemplary transactions may include logging into a website, application or computer system; a user withdrawing money from an ATM; a user initiating a "forgotten password" procedure; a user attempting to enter a restricted area of a building or environment; a payment exchange between two entities; a user attempting to perform a restricted action in a computer system; and/or any suitable application requiring authentication and/or authorization. Authentication preferably includes validating the identity of at least one involved party relevant to a transaction. Authorization preferably includes validating authority or permission of an entity to execute a transaction. For authentication, the authority device preferably belongs to the authentic user for self-approval of transactions. For authorization, the authority device preferably belongs to an authoritative user (e.g., an authority agent) that is preferably in charge of regulating transactions of a user involved in the transaction. The transactions are preferably initiated in an online environment, where parties may be communicating using a computing device or public/private network, but the transactions may alternatively occur offline where parties may be interacting in the real world. The user or device initiating the transaction is ideally a legitimate party, as shown in FIG. 2, but in the situations where a malicious party initiates or participates in the transaction, the method is preferably able to properly identify such a situation, as shown in FIG. 3. After a malicious transaction is prevented the approval rules for a transaction may be dynamically altered to increase security. The transaction is preferably sent from a requesting entity such as a website, application, or device. The requesting entity is typically a system in communication with the authentication platform. An application programming interface (API) or any suitable protocol is preferably used to communicate between the requesting entity and the authentication platform. In one variation, the communication sent from the requester is encrypted and the authority device preferably decrypts the information. This variation preferably prevents the authentication platform from inspecting or accessing the communicated information which may be applicable when a third party is passing sensitive information through the authentication platform. As an alternative variation, the communication between the requester and the authentication platform is preferably encrypted or otherwise cryptographically protected and communication between the authentication platform and the authority device verifies that the communication is from the authority device. Any suitable steps may be taken to secure the communication between the requesting entity, the authentication platform and the authority device.

Note that the authority of the authority agent to authorize transactions may be managed in any manner. For example, the authentication platform may maintain descriptors of user identity that may be used to link accounts of authority agents with service providers (e.g., login information of a website) to the authority agent and/or authority device. In this example, information corresponding to these user identity descriptors may be transmitted by the service provider or other initiator to the authentication platform (when requesting authorization). At the authentication platform, this information may be used to identify the authority agent or authority device (e.g., a user account at the authentication platform associated with the authority agent, which may be independent of any user account maintained at the service provider).

Step S130, which includes messaging the authority device with the transaction request, functions to push a notification to a secondary device for authentication or authorization. Such a notification preferably includes a response prompt and is displayed on the authority device, enabling a user response. Additionally or alternatively, response to the transaction request may be performed in any manner. The authority device is preferably a device only the authentic user or an authorized user would possess. The message is preferably sent through a communication channel between the authority device and the authentication platform. The communication channel is preferably a push notification service provided through the authority device. The communication channel may alternatively be a short message system SMS network, email, a instant message, an in-app notification system, web based websocket or publication-subscription channels, image based transmission of transaction information such as through QR-codes captured by a camera, or any suitable technique for messaging the device. The messages preferably appear on the authority device or create an alert in substantially real-time (e.g., in less than 5 minutes). The real-time aspect of the messaging functions to enable authentication and authorization at the time of the transaction. In one variation, tracking a registered authority device may additionally be performed by the authentication platform. For example, in a persistent TCP/IP connection model, a mobile device moving from a service provider data network to a WiFi network may change IP addresses and therefore initiate a new persistent connection. Upon receiving that new connection and an identifier of the mobile device, the authentication platform preferably updates the state of the device for the account associated with that device. Then, the proper connection is preferably used for messaging the authority device. Some communication channels may have limited throughput and lack the capability to present a full message from the authentication platform. For example, SMS messages have a 160 character limit. An initial message may include a unique identifier, which can then be used to retrieve a full message. For example, the SMS message may include a URL link or code which can be used to retrieve a full message from an application or website. The full message may provide additional information and options for a transaction response. The messages transmitted over the communication channel may additionally be cryptographically signed and encrypted using an established setup between the authentication device and the authentication platform. Additionally the messages preferably include transaction information (i.e., metadata). The transaction information may include account or entity name, transaction details, location and time of transaction, IP address of initiating host, geolocation of the IP address or any suitable information or any suitable data on the transaction. In one example an online bank transfer may have a message with transaction information including payer, payee, account numbers, transfer amount, and transaction date and time.

Step S150, which includes receiving an authority agent response from the authority device to the authentication platform, functions to process a response from an authentic user or authorized user. The response preferably confirms or denies a transaction. The confirmation and denial of a transaction may additionally be set to indicate any suitable form of response. Preferably, the initial options are to accept or reject a transaction. Additionally, if a transaction is rejected a reason for rejection may be included such as "canceled because of change of mind" or "possible malevolent transaction". Other variations may include a variety of options that may change based on the application. The available forms of responses may be included in the message information. Other forms of responses may allow a variety of multiple-choice options, variable setting options, or any suitable form of response input. For example, if a parent is acting as an authorization provider for an ATM withdraws made by a child, a message may be sent to a phone of the parent indicating that the child is attempting to withdraw a particular amount (e.g., $50). The parent may be able to respond allowing a withdrawal of only a lower amount (e.g., $20). As an additional sub-step to receiving an authority agent response, the response is preferably verified to be a legitimate response from the authority device as opposed to an entity imitating the device. Secure Socket Layer (SSL), a Hash-based Message Authentication Code (HMAC), message signing, or any suitable cryptographic protocol may be used to verify the response is from the authority device.

Step S160 and S162, which includes if the authority agent response confirms the transaction, communicating a confirmed transaction to the initiator, and if the authority agent response denies the transaction, communicating a denied transaction to the initiator, function to communicate the authentication and/or authorization to the initiator of the transaction. Any suitable response to a transaction is preferably communicated back to the requesting entity (e.g., a third party website or an ATM machine). The requesting entity can then preferably take appropriate action. If the transaction is confirmed or approved, the transaction proceeds. If the transaction is denied or altered, the requesting entity preferably halts or prevents the transaction. The requesting entity can preferably use the transaction response to modify a transaction state in any suitable manner. Based on the variety of responses from authentic users and/or authorized users, rules may determine when to confirm or deny a transaction. In a variation of the method, there may be a plurality of authority devices registered for authorization and/or authentication. A rule may be setup for which authority devices to message, in what order, and the timing of the messaging. Additionally, rules may be set for received responses. A particular threshold for the number of responses from the plurality of authority devices may be set. For example, four authority devices may be messaged for authorization and at least three must confirm the transaction for it to be confirmed. In another example, a plurality of authority devices for authentication may be registered, and the authority devices are messaged one after the other until at least one responds. The response from an authority agent may alternatively be passed on to the requesting entity with no analysis.

2. Completing Transactions after Additional Agent Verification

Figure 7:
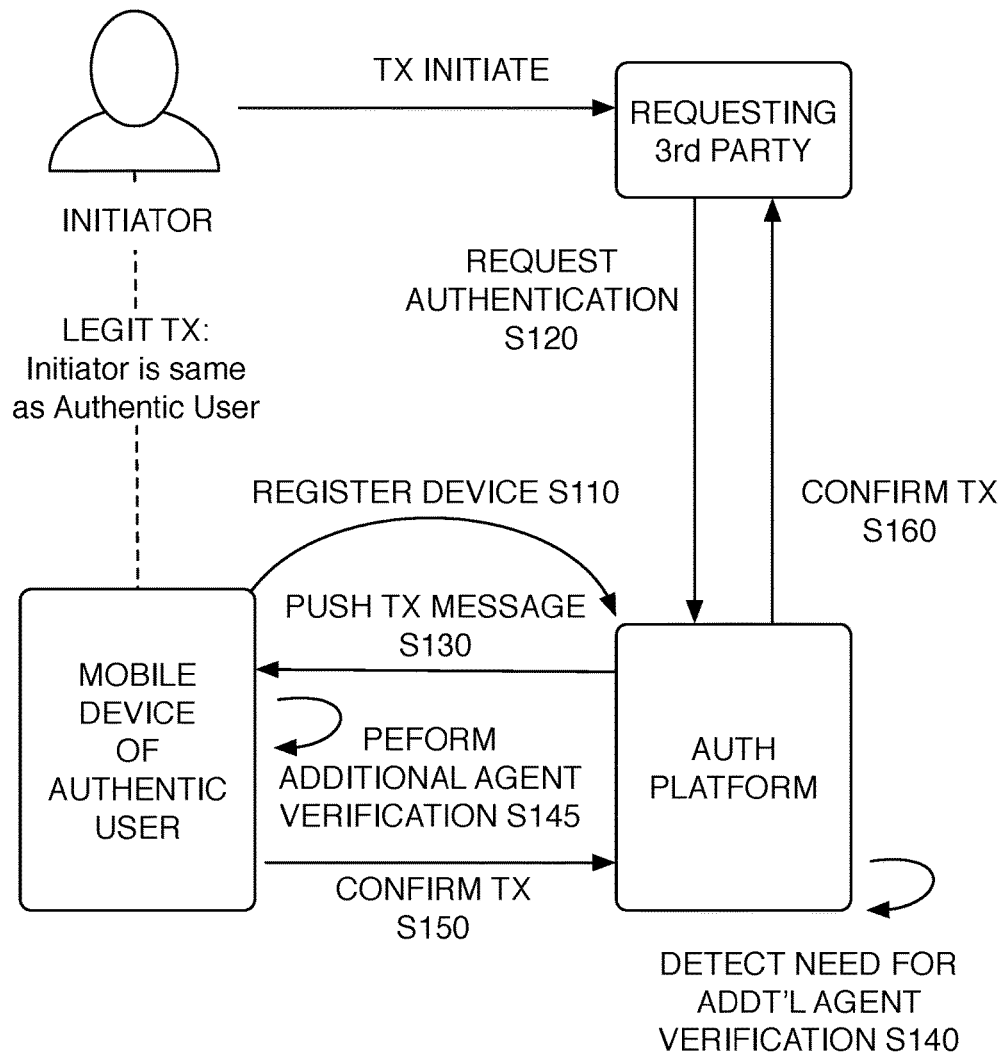
FIG. 7 is a schematic representation of a variation of a method of a preferred embodiment for authenticating a transaction.

As previously disclosed, in a variation of a preferred embodiment, the method 100 includes detecting a need for additional agent verification S140 and performing additional agent verification S145, as shown in FIG. 1 and FIG. 7.

The authentication approach described in Section 1 utilizes non-intrusive techniques to better establish authentication and/or authorization of parties involved in a transaction by (ideally) requiring possession of the authority device to complete the transaction. This authentication approach may be combined with other authentication approaches; for example, possession authentication by the authentication platform may be used to substitute knowledge authentication by a service provider (e.g., a service provider may require that an authority agent successfully authenticate at the service provider using a username and password).

In some cases, it may be desired to verify not only that the authority agent device is possessed by a person (or other entity) who approves a transaction in order to complete the transaction, but also that the person who approves the transaction is an authorized user of the authority device.

To some extent, this desire may be met by native security standards implemented on the authority device. For example, a smartphone may require that the smartphone may be unlocked (e.g., using a passcode) to respond to a notification. However, native security standards may not be sufficient to ensure that the person who approves a transaction is an authorized user of the authority device; for example, many smartphones enable responding to notifications without requiring unlocking credentials to be re-entered if the smartphone has not been locked (either manually or automatically, e.g., due to inactivity) since the most recent unlocking event.

The variation of the method described in this section therefore functions to perform additional agent verification (S145) as a technique to better verify responses to authentication and/or authorization requests transmitted to authority devices as originating from authorized users of those authority devices.

S140 includes detecting a need for additional agent verification. S140 functions to detect a need or desire for implementation of additional agent verification.

Detecting a need for additional agent verification S140 preferably includes receiving (or otherwise setting) policy information, from an entity authorized to set authentication policy, that additional agent verification should be performed. S140 may additionally or alternatively include receiving any information regarding configuration of additional agent verification; for example, conditions in which additional agent verification should be performed (e.g., certain times, for certain users, for certain device types). Policy information may be set by any suitable entity; e.g., an authentication system user, a service provider administrator, an authentication platform administrator. Policy information may be given varying priority based upon the setting agent; for example, policy set by the authentication platform may override policy set by the service provider, policy set by the service provider may override policy set by an authentication platform user, etc.

Additional agent verification policy may include any policy or configuration options related to the performance of additional agent verification. For example, additional agent verification policy may include specifying when and under what conditions additional agent verification is performed, how additional agent verification is performed, what credentials are acceptable to perform additional agent verification, etc.

Detecting a need for additional agent verification S140 may additionally include detecting that a trigger for additional agent verification has been tripped; that is, a conditional event that modifies or enables performance of additional agent verification is satisfied. Triggers for additional agent verification are preferably set by additional agent verification policy, but may additionally or alternatively be set in any manner.

As a first example, policy may specify that additional agent verification be mandated (to complete a transaction) at least once per time period to authorize a service provider login event (e.g., once per month, starting with the first login under this policy).

Additional agent verification may be triggered by a variety of conditions. Conditions that may trigger additional agent verification include conditions related to an authentication platform (e.g., if the authentication platform is on alert due to security issues, additional agent verification may be implemented), conditions related to a service provider (e.g., a service provider may request additional agent verification for one or more of general security concerns, concerns that a particular user account may be breached, unusual account activity, etc.), conditions related to an authority device (e.g., an authority device is of a particular model, an authority device operates a particular operating system or authentication app version, an authority device is in an unusual location), conditions related to an authority agent (e.g., an authority agent's behavior on another authority device is unusual), transaction conditions (e.g., conditions relating to the specific transaction or transaction type of the transaction request for which authorization is requested) and/or any suitable conditions.

Additional agent verification triggers may be linked to any modification of additional agent verification procedure. For example, some triggers may cause additional agent verification to be required for a transaction, while other triggers may modify the type of additional agent verification to be performed (e.g., fingerprint vs. passcode).

In a first example, an authentication platform may include an additional agent verification trigger that mandates additional agent verification for security-sensitive applications (i.e., any application that authentication platform designates as needing additional agent verification for related transactions). If a transaction related to a security-sensitive application occurs, additional agent verification must occur to complete the transaction. In this first example, S140 may include detecting that a transaction is associated with a security sensitive application in any manner. For example, S140 may include comparing an identifier (e.g., a name, an associated domain name, etc.) of a service provider to a list of security-sensitive applications (which may be designated, for example, by platform administrators or any other entities) and implementing additional agent verification for transactions regarding any service provider on this list. S140 may additionally or alternatively detect security sensitivity of applications using any technique of U.S. patent application Ser. No. 15/075,687, the entirety of which is incorporated by this reference.

In a second example, an authentication platform (or service provider) may include an additional agent verification trigger that mandates additional agent verification for security-sensitive users (i.e., any user determined to need additional agent verification). Security-sensitive users may include users of a service provider (as designated by the service provider); in such an implementation, the service provider may communicate such designation to the authentication platform in any manner. For example, the service provider may simply flag any transaction requests related to a security-sensitive user as requiring additional agent verification (without explicitly informing the authentication platform that a particular user is security-sensitive). As another example, the service provider may provide a list of security-sensitive users to an authentication platform; these users may in turn be linked to specific instances of authenticating apps and/or authority devices. Security-sensitive users may additionally or alternatively include authority agents; that is, security-sensitive users may be specified by the authentication platform rather than another entity. For example, a user of an authentication app (of the authentication platform) may be an authority agent for transactions involving several external entities; the authentication app may require additional agent verification for that user for transactions involving all of those external entities if the user is determined to be a security-sensitive user by the authentication platform. Security-sensitive users may additionally or alternatively be determined by any entity in any manner.

In a third example, an authentication platform (or service provider) may include an additional agent verification trigger that mandates additional agent verification for security-sensitive devices (i.e., any authority or authentication device determined to need additional agent verification). If a transaction involving a security-sensitive device occurs, additional agent verification must occur to complete the transaction. In this third example, S140 may include detecting that a transaction is associated with a security sensitive device in any manner. For example, S140 may include comparing an identifier (e.g., a model designation, a phone number, an OS version, an authentication application version, etc.) of a device to a list of security-sensitive devices (which may be designated, for example, by platform administrators or any other entities) and implementing additional agent verification for transactions regarding any authentication/authority device on this list. S140 may additionally or alternatively detect security sensitivity of devices using any technique of U.S. patent application Ser. No. 15/139,545, the entirety of which is incorporated by this reference.

In a fourth example, an authentication platform (or service provider) may include an additional agent verification trigger that mandates additional agent verification for security-sensitive transactions (i.e., any transaction determined to need additional agent verification). Similar to the preceding examples, security-sensitive transactions may be determined any manner (e.g., as indicated by a service provider, set based on a transaction type, etc.). Additionally or alternatively, additional agent verification may be triggered by determining that a transaction is suspicious (i.e., the transaction may not be initiated by an authorized entity). The security sensitivity and/or suspiciousness of transactions may be determined in any manner; for example, using the techniques of U.S. patent application Ser. No. 14/955,377, the entirety of which is incorporated by this reference. For example, a service provider may indicate that a transaction is potentially suspicious in a transaction request. As another example, analysis of a transaction request in light of previous transaction requests may be performed by the authentication platform to identify a transaction request as suspicious; e.g., a transaction request originating from Moscow may be suspicious for an authority device last reported to be in the United States.

S145 includes performing additional agent verification. S145 functions to verify that authentication and/or authorization based on interaction between a user and a possession factor (e.g., an authentication application on a smartphone) is granted only if that user is authorized to use the possession factor.

In some ways, additional agent verification is similar to an additional authentication factor; that is, authorization of a transaction preferably requires not only authorization occurring in response to possession of a possession factor, but also authorization occurring in response to successful additional agent verification. However, additional agent verification is more restricted and specific than a general additional authentication factor; additional agent verification is preferably performed at the possession factor at the time of authorization using the possession factor. This link between additional agent verification and possession-based auth. means that in some cases, additional agent verification may be performed entirely (and potentially entirely locally) by an authority device without requiring additional communication (e.g., with a service provider, with an authentication platform, etc.). Alternatively, additional agent verification may be performed in part or in full by any suitable entity (e.g., the authentication platform).

S145 preferably includes collecting agent verification data directly from authority device users, but may additionally or alternatively collect agent verification data in any manner; for example, using sensors of the authority device without explicitly requesting agent verification data from an authority device user.

Agent verification data may include any data capable of verifying a user as an authorized user of an authority device (or of an authentication application, etc.). Agent verification data may include knowledge data (e.g., a numerical passcode known to an authorized user of the authority device), biometric data (e.g., fingerprint data of a finger of an authorized user of the authority device, characteristic speech frequency of an authorized user of the authority device), or any other suitable data. For example, agent verification data may include location data specifying the location of an authority device. As another example, agent verification data may include usage data (e.g., data relating to how a user uses applications on a smartphone serving as an authority device), accelerometer data (e.g., data characterizing motion patterns of an authorized user), and/or authority device network status data (e.g., determining which network an authority device is connected to via WiFi).

Agent verification data is preferably verified by comparing the agent verification data to expected results for a particular user. Such verification may occur in any manner. Agent verification preferably includes evaluating a comparison of collected agent verification data and expected agent verification data and confirming agent verification if the comparison results in a similarity exceeding a comparison threshold. This comparison threshold may be set in any manner, and may differ for various types of agent verification. For example, comparison using a numerical passcode may require an exact match, whereas comparison of retinal scans may require a 99.5% match.

Figure 8:
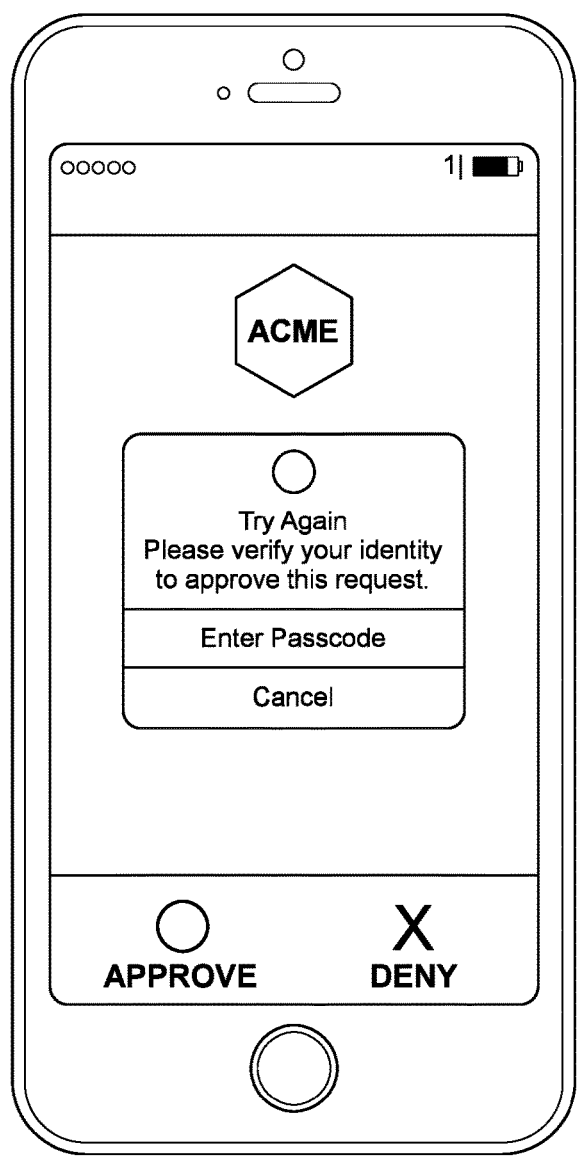
FIG. 8 is an example interface of an authenticating application used to perform additional agent verification.

Additional agent verification may, in some cases, allow users to select a verification method. For example, a user may be allowed to perform additional agent verification by scanning his/her fingerprint using a fingerprint reader of an authority device or submit a numerical passcode (e.g., via user selectable options), as shown in FIG. 8. As another example, a user may be allowed to submit a numerical passcode only if a fingerprint scanner of the authority device is malfunctioning.

Additional agent verification may be performed at any step of the authentication process. As described in Section 1, transactions are preferably authorized in response to an authority agent response (e.g., selecting a transaction approval button in an authentication application notification). Additional agent verification may supplement this process in any manner.

For example, additional agent verification may be performed prior to requesting the authority agent response. In this example, the authority agent response may only be requested if additional agent verification is completed successfully (or alternatively may be requested regardless of the result of additional agent verification)

As another example, additional agent verification may be performed after requesting the authority agent response. In this example, additional agent verification may be performed subject to any conditions (e.g., additional agent verification may only be performed if a transaction is approved, additional agent verification may be performed regardless of transaction approval, additional agent verification may only be performed if a transaction is denied, etc.). The final transmission of the approval response may be contingent on successful additional agent verification.

Note that while not explicitly discussed in the paragraphs of the specification describing S140, data related to authority agent responses may be used as a trigger for requiring additional agent verification (e.g., if user approves a transaction uncharacteristically quickly, this may automatically trigger additional agent verification).

As a third example, the submission of additional agent verification data may serve as an authority agent response. For example, an authentication application may ask a user to scan their fingerprint to approve a transaction or deny the transaction using a selection on a touchscreen of the authority device, as shown in FIG. 8. In this example, the fingerprint scan may be inferred as an authority agent response.

Additional agent verification S145 is preferably performed locally on the authority device. For example, additional agent verification may be performed using a fingerprint reading API that allows a smartphone to be used as an authority agent. The fingerprint API may, for example, enable an application (e.g., the authentication application) to request verification that a fingerprint is a fingerprint of an authorized user of the smartphone. The authorized user may be specific to the application, but may additionally or alternatively be a user generally authorized to access functions of the authority device (e.g., the user may be authorized as the primary user of a smartphone).

As another example, additional agent verification may be performed using a passcode stored locally on the authority device.

Additional agent verification S145 may alternatively be performed remotely (fully or in part). For example, S145 may include transmitting agent verification data to a service provider or authentication platform (or other entity). In this example, verification may be performed by the remote entity. For example, S145 may include capturing fingerprint data and transmitting that data to an authentication platform for verification. Any data transmitted to a remote entity for verification purposes may be encrypted.

Alternative embodiments may implement the above methods in a computer-readable medium storing computer-readable instructions. The instructions are preferably executed by computer-executable components preferably integrated with an authentication platform. The authentication platform is preferably hosted on a distributed computing system or cloud based platform but may alternatively be hosted in any suitable system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The authentication platform preferably includes an API for third party services and devices to use in initiating transactions and interpreting responses from the authentication platform. The platform preferably includes a communication channel such as a public or private network or SMS network to communicate with at least one authority device. The authority device is preferably a mobile phone but may be any suitable personal computing device.

As a person skilled in the art will recognize from the previous detailed description and from the figures and claims, modifications and changes can be made to the preferred embodiments of the invention without departing from the scope of this invention defined in the following claims.

We claim:

1. A method of completing a transaction that requires authorization by an authority agent, the method comprising:
    registering, on an authentication platform, an authenticating application of an authority device as associated with the authority agent; wherein the authority agent is recognized as an authorized user of the authority device by an operating system of the authority device;
    receiving, at the authentication platform, an authentication policy from an administrator of a service provider; wherein the authentication policy specifies that additional agent verification must be performed to complete the transaction;
    receiving, at the authentication platform, a transaction request from the service provider; wherein the transaction request is associated with the transaction;
    in response to receiving the transaction request, pushing an authentication notification to the authenticating application of the authority device;
    at the authentication application, displaying the authentication notification on the authority device; wherein displaying the authentication notification comprises displaying a prompt directing the authority agent to perform a fingerprint scan at a fingerprint reader of the authority device;
    at the authentication application, performing additional agent verification by verifying, locally and with the operating system, that the fingerprint scan is associated with the authorized user of the authority device;
    in response to the additional agent verification, transmitting an authority agent response from the authentication application to the authentication platform, and, at the authentication platform, authenticating the authority agent response; and
    in response to authenticating the authority agent response, transmitting a transaction confirmation from the authentication platform to the service provider.

2. The method of claim 1, wherein the authentication notification includes a selectable option that allows additional agent verification to be performed in absence of the fingerprint scan by verifying, locally and with the operating system, a numerical passcode submitted by the authority agent.

3. The method of claim 1, further comprising receiving approval of the transaction request from the authority agent; wherein the authentication notification directs the authority agent to perform the fingerprint scan only after receiving approval of the transaction request from the authority agent; wherein transmitting the authority agent response comprises transmitting the authority agent response in response to both of the additional agent verification and receiving approval of the transaction request from the authority agent.

4. The method of claim 1, further comprising prompting the authority agent to approve the transaction request after performing the additional agent verification; wherein transmitting the authority agent response comprises transmitting the authority agent response in response to both of the additional agent verification and receiving approval of the transaction request from the authority agent.

5. A method of completing a transaction that requires authorization by an authority agent, the method comprising:
    registering, on an authentication platform, an authority device as associated with the authority agent;
    receiving, at the authentication platform, a transaction request from a service provider; wherein the transaction request is associated with the transaction;
    in response to receiving the transaction request, pushing an authentication notification to the authenticating application of the authority device;
    at the authentication application, displaying the authentication notification on the authority device;
    at the authentication application, receiving approval of the transaction request from the authority agent;
    at the authentication application, directing the authority agent to perform a fingerprint scan only after receiving approval of the transaction request from the authority agent; wherein the fingerprint scan is performed at a fingerprint reader of the authority device;
    at the authentication application, collecting and verifying the fingerprint scan;
    in response to verification of the fingerprint scan, transmitting an authority agent response from the authority device to the authentication platform, and, at the authentication platform, authenticating the authority agent response; wherein transmitting the authority agent response comprises transmitting the authority agent response in response to both of performing the fingerprint scan and receiving approval of the transaction request from the authority agent; and
    in response to authenticating the authority agent response, transmitting a transaction confirmation from the authentication platform to the service provider.

6. The method of claim 5, further comprising detecting, at the authentication platform, that the service provider is associated with a security-sensitive application; and, in response to detecting that the service provider is associated with the security-sensitive application, automatically implementing an authentication policy that specifies that the fingerprint scan must be performed to complete the transaction.

7. The method of claim 6, wherein detecting, at the authentication platform, that the service provider is associated with a security-sensitive application comprises analyzing an identifier of the service provider with regard to a list of security-sensitive applications maintained at the authentication platform.

8. The method of claim 5, further comprising detecting, at the authentication platform, that the authority agent is a security-sensitive user; and, in response to detecting that the authority agent is a security-sensitive user, automatically implementing an authentication policy that specifies that the fingerprint scan must be performed to complete the transaction.

9. The method of claim 8 wherein detecting, at the authentication platform, that the authority agent is a security-sensitive user comprises receiving identification of the authority agent as a security-sensitive user from the service provider.

10. The method of claim 5, further comprising detecting, at the authentication platform, that the authority device is a security-sensitive device; and, in response to detecting that the authority device is a security-sensitive device, automatically implementing an authentication policy that specifies that the fingerprint scan must be performed to complete the transaction.

11. The method of claim 10, wherein detecting, at the authentication platform, that the authority device is a security-sensitive device comprises analyzing an identifier of the authority device with regard to a list of security-sensitive devices maintained at the authentication platform.

12. The method of claim 5, wherein verifying the fingerprint scan comprises verifying the fingerprint scan locally and without transmitting the fingerprint scan to the authentication platform.

13. The method of claim 5, wherein verifying the fingerprint scan comprises transmitting the fingerprint scan to the authentication platform and receiving verification of the fingerprint scan from the authentication platform.

14. The method of claim 13, further comprising encrypting the fingerprint scan prior to transmitting the fingerprint scan.

15. The method of claim 5, further comprising detecting, at the authentication platform, that the transaction request is a suspicious transaction request; wherein directing the authority agent to perform the fingerprint scan comprises directing the authority agent to perform the fingerprint scan only in response to suspicious transaction requests.

16. The method of claim 15, wherein detecting that the transaction request is a suspicious transaction request comprises receiving indication from the service provider that the transaction request is a suspicious transaction request.

17. The method of claim 15, wherein detecting that the transaction request is a suspicious transaction request comprises detecting that the transaction request is a suspicious transaction request based on historical transaction request data stored at the authentication platform.

* * * * *